United States Patent Office 3,657,347
Patented Apr. 18, 1972

---

3,657,347
PRODUCTION OF LONG CHAIN AMINES BY REACTING MONOETHANOLAMINE, MONOISOPROPANOLAMINE AND/OR ETHYLENEDIAMINE WITH LONG CHAIN STRAIGHT CHAIN SECONDARY CHLORIDES
Thomas C. Muller, East Orange, Lawrence B. Nelson, Franklin Lakes, and Bernard R. Bluestein, Glen Rock, N.J., assignors to Witco Chemical Corporation, New York, N.Y.
No Drawing. Continuation-in-part of application Ser. No. 673,917, Oct. 9, 1967. This application June 17, 1970, Ser. No. 47,139
Int. Cl. C07c 85/04
U.S. Cl. 260—583 P         4 Claims

---

ABSTRACT OF THE DISCLOSURE

Production of long chain amines, in a form substantially free from olefins, by reacting (a) monoethanolamine, N - methylethanolamine, monoisopropanolamine, and/or ethylenediamine with (b) secondary monochlorinated straight chain paraffin hydrocarbons containing from 6 to 26 carbon atoms, particularly those prepared by partially chlorinating a petroleum derived hydrocarbon fraction consisting essentially of $C_8$ to $C_{18}$ straight chain paraffins to the extent whereby from about 10 to about 25 mol percent of the paraffins are monochlorinated, said fraction being largely free from branched chain hydrocarbons and from chlorinated branched chain hydrocarbons.

---

This application is a continuation-in-part of application Ser. No. 673,917, filed Oct. 9, 1967, now abandoned.

Our invention relates to the production of certain long chain amines by reacting monoethanolamine, N-methylethanolamine, monoisopropanolamine, and/or ethylenediamine with secondary monochlorinated straight chain paraffin hydrocarbons containing from 6 to 26 carbon atoms, particularly from 8 to 18 carbon atoms, the reactants being so selected that, in the reaction, there is substantially no formation of olefins, and with the result, therefore, that the final reaction products contain the desired long chain amines substantially uncontaminated with olefins, or, for that matter, other objectionable contaminants or byproducts. The olefin content in such products is particularly advantageously less than about 5% by weight of the total product.

It has heretofore been suggested to prepare long chain amines by reacting ammonia, or primary or secondary amines, with halogenated particularly chlorinated, hydrocarbons, including primary alkyl chlorides and chlorinated long chain paraffin hydrocarbons, as disclosed, for instance, in U.S. Pats. Nos. 2,016,956; 2,063,934; 2,272,-489; 2,361,457; 2,541,088; 2,541,089; 2,695,314; 2,874,-185; and German Patent Nos. 648,088; 688,744; 767,087; and 1,108,236. Thus, in the case of the practice of the process of Pat. No. 2,063,934, the reactants utilized, as in Example I of said patent, result in the production of reaction products containing very substantial amounts of olefins. This is due to the fact that a sizable portion of the molecules in paraffin waxes contain tertiary carbon atoms because of branching in the paraffin wax molecules. These tertiary carbon atoms are the first ones to be chlorinated to form tertiary chlorides, and such tertiary chloride groups form olefins during the reaction with the amines. Moreover, chlorinated paraffin waxes contain an average of 2 to 3 chlorine atoms per hydrocarbon molecule with a sizable proportion of molecules containing even 4 or 5 chlorine atoms or more and these molecules tend to form olefins very readily. Similarly in Patent No. 2,695,314, the kerosene fractions which are shown to be reacted with alkylenepolyamines contain only about 20% straight-chain hydrocarbons and the remaining 80% material is highly branched, so that the branched kerosene hydrocarbons form tertiary chlorides which results in a large portion of the chlorinated kerosene being dehydrochlorinated during the reaction with the polyamines with the formation of a large amount of olefins.

The reaction of ammonia with long chain primary alkyl halides is known to produce secondary amines in good yield. When an alkyl amine is used in place of ammonia, the reaction product contains not only secondary amines but, also, substantial proportions of tertiary amines. When secondary aliphatic halides are alkylated with amines, as heretofore known to the art, mixtures are obtained which include alcohols, amines of various degrees of substitution, and substantial proportions of olefins, frequently of the order of 30 to 40% and even higher. Because of the relatively low yields of desired monoalkylated amines and the economic problems related to separation considerations, alkylations of amines with secondary aliphatic halides have been of only limited commercial interest and, therefore, alternate routes to the commercial production of long chain amines have been exploited.

So far as we are aware, there has been no recognition in the art of the importance and significance of the factors which make for the successful, economical production of long chain amines from chlorinated long chain hydrocarbons wherein the chlorinated long chain hydrocarbons must be essentially monochlorinated and free from any substantial quantities of di- or polychlorinated hydrocarbons, must be substantially free of branched chain chlorinated hydrocarbons, and must be substantially secondary chlorinated $C_6$ to $C_{26}$ straight chain hydrocarbons. Coupled with these characteristics of the chlorinated hydrocarbons is the selection specifically of monoethanolamine, N - methylethanolamine, monoisopropanolamine and/or ethylenediamine for reaction with said monochlorinated hydrocarbons because alkanolamines generally or alkylenepolyamines generally do not react in the same manner to produce products substantially free of olefins, an important desideratum of our invention. In this same connection, it may be noted that our invention is sharply distinguishable from practices wherein primary-chloro or bromo-alkanes, or active chlorocompounds such as substituted allyl, methallyl or benzyl chlorides, are reacted with amines since such reactions proceed easily without the formation of olefins and are distinct from the difficult problem of preparing long chain amines from secondary chloro-paraffins with which our present invention is concerned.

As stated above, in accordance with our invention, monoethanolamine, N-methylethanolamine, monoisopropanolamine, and/or ethylenediamine are reacted with secondary monochlorinated paraffin or straight chain hydrocarbons, or secondary monochlorides which may be represented by the formula

in which R is a straight chain hydrocarbon containing at least 4 carbon atoms and R' is an alkyl radical having at least one carbon atom. While said chlorides may be pure products, it is not only necessary that this be the case but, as indicated previously, it is an especially important aspect of our invention to utilize, in the reaction with the monoethanolamine, N-methylethanolamine, monoisopropanolamine and/or the ethylenediamine, chlorinated paraffinic hydrocarbons derived from essentially pure straight chain $C_8$ to $C_{18}$ hydrocarbons which have been monochlorinated to the extent of about 10 to about 25 mol percent and even more. The starting straight chain hydrocarbons can be readily prepared by known techniques, such as by the use of molecular sieves or by urea adduction, from petroleum fractions such as kerosene. By using monoethanolamine, N-methylethanolamine, monoisopropanolamine and/or ethylenediamine in the reactions with the long chain, straight chain secondary monochlorinated hydrocarbons, olefin formation is substantially avoided in contrast to the formation of substantial proportions of olefins when other amines such as ethylamine, diethanolamine and piperidine are used in the reaction with secondary monochlorinated hydrocarbons. It is important to the achievement of the results of our invention that the chlorinated paraffin hydrocarbons be largely monochlorinated although small proportions of di- or polychlorinated hydrocarbons can be tolerated, generally not in excess of about 15% of the chlorinated hydrocarbon content. To insure the presence of essentially monochlorinated hydrocarbons, the starting straight chain hydrocarbons are chlorinated only to the extent of about 10 to 25%.

It is also important to the obtainment of our results that the monochlorinated paraffin hydrocarbon mixture be substantially free of tertiary-chlorohydrocarbons since olefins tend to be produced therefrom even in the presence of monoethanolamine, N-methylethanolamine, monoisopropanolamine and/or ethylenediamine. Pure or commercial sources of the aforementioned amines can be used and, in the case of the monoethanolamine and monoisopropanolamine the content of di- and tri-homologues, for best results, should not exceed about 2% and should advantageously be even less.

In the practice of our invention, it has been found that the reaction of an excess of monoethanolamine with a straight chain $C_6$ to $C_{26}$ hydrocarbon chlorinated to the extent of about 20 to 25 mol percent yields essentially one type of product, namely a monoalkylated monoethanolamine with the functional groups randomly distributed throughout the paraffin chain.

The conversion rate is dependent upon the mol ratios of the monoethanolamine, N-methylethanolamine, monoisopropanolamine and/or ethylenediamine and the secondary monochlorinated paraffin hydrocarbon. Generally speaking, it is preferred to use the said amines in a large excess over that of the secondary monochlorinated paraffin hydrocarbon, preferably of that order of about a tenfold excess and even more. In general, as indicated, the reaction proceeds faster as the ratio of the aforesaid amines to the said chlorinated hydrocarbons is increased. A base material is employed to neutralize the hydrochloric acid formed in the reaction. Sodium carbonate is typical of a base which is especially satisfactory for this purpose since it effects neutralization without the formation of water. Other bases can, of course, be used such as potassium carbonate and sodium bicarbonate. Where, for instance, as a result of the neutralization, sodium chloride is formed, it is virtually insoluble in monoethanolamine and can readily be removed.

The reaction between the monoethanolamine, N-methylethanolamine, monoisopropanolamine and/or ethylenediamine and the secondary monochlorinated paraffin hydrocarbon may be carried out over a broad temperature range, generally in the range of from about 150° F. to about 425° F., and preferably in the temperature range of from about 185° F. to 375° F. The yield is somewhat diminished at relatively high temperatures and when operating at elevated temperatures, for instance, in the range of about 350° F. or somewhat less to about 425° F., it is desirable to carry out the reactions under an inert gas as, for example, argon or nitrogen. Pressure conditions are variable and the reaction may be carried out at atmospheric pressure and pressures in excess of atmospheric pressure, such as autogenous pressures, when, for example, the reaction is carried out in a sealed autoclave-type reaction vessel. Preferably the reaction is carried out at a pressure in excess of atmospheric pressure and in the range up to 100 lbs./sq. in.

The following examples are illustrative of the practice of the invention but they are not to be construed as in any way limitative since various modifications can be made in the light of the guiding principles and teachings disclosed herein.

EXAMPLE 1

A stainless steel reactor (138 gallon capacity) was charged with 281 lbs. (43 gallons) of a secondary chlorinated straight chain paraffin hydrocarbon, 228 lbs. (27 gallons) of monoethanolamine, and 32 lbs. of sodium bicarbonate. The secondary chlorinated straight chain paraffin hydrocarbon was derived from a kerosene rich in n-paraffins and substantially free of olefins and which was fractionated by means of molecular sieves to produce a straight chain hydrocarbon fraction having a $C_{11.5}$ average, and which was partially chlorinated to the extent that about 20 mol percent of the paraffins was chlorinated, about 89% being monochloroparaffins, about 10% being dichloroparaffins and about 1% being polychloroparaffins.

The reactor was flushed with nitrogen until most of the air had been displaced. A blanket of nitrogen was maintained during the reaction. The reactor temperature was increased slowly until a temperature of 370° F. was attained. The contents of the reactor we stirred at this temperature with high speed agitation for a period of 4 hours, the pressure being maintained below 100 lbs./sq./in. The contents of the reactor were allowed to remain undisturbed with no agitation for at least 2 hours after completion of the reaction.

After the contents of the reactor had cooled, the upper layer (paraffin+product) was pumped or siphoned from the top of the reactor. (Approximate weight of the upper layer was 286 lbs.)

The lower layer (monoethanolamine) and solid sodium chloride) were drawn from the bottom of the reactor and weighed (approximate weight was 244 lbs.). The sodium chloride was filtered or centrifuged from the monoethanolamine.

After filtration, the monoethanolamine was heated under diminished pressure (0.1 atmosphere or less) at 160 degrees F. to remove water. The weight of monoethanolamine was approximately 206 lbs. The recovered monoethanolamine was retained for reuse.

The upper layer (paraffin+product) was acidified by the addition of 3.93 gallons of 36% HCl. The addition was carried out slowly because of the exotherm. At this point, the aqueous layer was below pH 4. (If the pH is above this value, it should be adjusted by the addition of more acid.) The neutralization step was carried out under conditions of good agitation. After neutralization, the mixture was allowed to stand for a minimum of 2 hours. When complete separation of the phases had taken place, the upper layer was colorless and transparent.

The lower layer, which contained the hydrochloride salt of the product, was drawn off and retained. The upper layer (paraffin) was washed with water (2 washings of 5 gallons each are generally sufficient) to remove the HCl. The paraffin was separated, weighed and transferred to a storage vessel. (Approximate weight of paraffin was 206 lbs.)

To the lower layer were added 60 lbs. of an aqueous solution (25% by weight) of sodium hydroxide. The addition was made slowly to dissipate the heat evolved. The aqueous (lower) layer should be above pH 10 after neutralization. The mixture was allowed to remain undisturbed for a period of at least 5 hours. At this point, the aqueous (lower) layer was drawn off and discarded.

The weight of the upper layer was approximately 75 lbs. at this point. The product was heated under diminished pressure to remove water. A minimum of 9.8 lbs. (1.2 gals.) of water was removed. The product was then filtered to remove sodium chloride. The filtrate (product) was approximately 64 lbs.

About 56 pounds of the REA (N.E. 284) were recovered. The term REA is used to denote a long chain amine product made in accordance with our present invention wherein monoethanol amine is employed in the reaction with a secondary monochlorinated $C_6$ to $C_{20}$ paraffin or straight chain hydrocarbon.

EXAMPLE 2

A 2-liter stainless steel autoclave fitted with a glass liner was charged with 600 g. of the monochloroparaffin used in Example 1, 486 g. of monoethanolamine and 66 g. of sodium bicarbonate. The autoclave was flushed with nitrogen for a period of 1 hour. The temperature of the autoclave was brought to 355 degrees F. The reaction was run at this temperature under nitrogen for a period of 5 to 6 hours. The pressure usually attained during a run was 80 to 100 p.s.i.g. After the reaction mixture had cooled, the contents were transferred to a 2-liter separatory funnel and the liquid phases were separated. The lower phase was filtered in order to remove inorganic salts. The salt cake was washed with a minimum quantity of methanol which was subsequently removed under diminished pressure. The upper layer was acidified with concentrated HCl until the pH of the aqueous phase reached a value of 2. The resulting two phases were separated. The upper phase was washed with water and dried over anhydrous sodium sulfate. The lower phase, after separation, was neutralized with 50% aqueous sodium hydroxide. Again, two layers appeared. The upper layer (REA product) was separated and heated under reduced pressure to remove water. The product was then filtered to remove the small amount of residual sodium chloride. The weight of REA product was 136 g. It contained approximately 10% unreacted paraffin hydrocarbons.

EXAMPLE 3

A 2-liter stainless steel autoclave fitted with a glass liner was charged with 65 grams of 2-chlorooctane, 324 g. of monoethanolamine and 50 g. of sodium bicarbonate. The autoclave was flushed with nitrogen for a period of 1 hour. The temperature of the autoclave was brought to 375 degrees F. and the pressure attained a value of 90 p.s.i.g. The reaction was run for a period of 5 to 6 hours under nitrogen with vigorous agitation. The work-up procedure was essentially the same as that described in Example 1. The reaction product, containing mainly the long chain amine reaction product of monoethanolamine with said monochlorooctane, essentially free of olefins, weighed 59 g.

EXAMPLE 4

(a) A mixture of secondary-monochloroalkanes was prepared by reacting commercial $C_{11}$–$C_{13}$ mixed secondary-alcohols with thionyl chloride.

(b) 200 g. (0.96 mole) of the mixed secondary-monochloralkanes (average M.W. 204.5), produced pursuant to part (a) of this Example 4, were reacted with 600 g. (9.85 moles) of monoethanolamine and 85 g. of sodium bicarbonate for 5 hours at 365 degrees F. in a pressure autoclave, as described in Example 1. After work-up in the manner described, an 85% yield of monoalkylated monoethanolamine, substantially free of hydrocarbons and of chloroalkanes, was obtained.

EXAMPLE 5

The procedure described in Example 1 was carried out but using ethylenediamine in place of monoethanolamine, and except that the reaction was run at 350 degrees F. instead of 370 degrees F. and a longer reaction period was employed, namely, 6 hours; instead of removing the water from the recovered ethylenediamine by heating, a drying agent was used; and twice as much HCl was added to the paraffin layer as in Example 1.

EXAMPLE 6

A 2-liter stainless steel autoclave fitted with a glass liner was charged with 603 g. of the monochloroparaffin used in Example 1, 607 g. of N-methylethanolamine and 69 g. of sodium bicarbonate. The autoclave was flushed with nitrogen for a period of 1 hour. The temperature of the autoclave was brought to 375° F. The reaction was run at this temperature under nitrogen for a period of 4 hours. The work-up procedure was essentially the same as that described in Example 1. The reaction product, containing mainly the long chain amine reaction product N-methylethanolamine and chlorinated paraffin, weighed 127 g.

EXAMPLE 7

The procedure described in Example 3 was carried out except that ethylenediamine was used in place of the monoethanolamine. The reaction product obtained weighed 59 g. and contained mainly the long chain amine reaction product of ethylenediamine with monochlorooctane, essentially free of olefins.

The following examples show the preparation of various derivatives of the long chain amines produced in accordance with our invention.

EXAMPLE 8

(a) To 50 g. of the REA produced in accordance with Example 1, in a 250 ml. R.B. flask, was added, with cooling, 18 ml. of concentrated sulfuric acid. The mixture became dark brown in color. The flask was subjected to a vacuum of 2 mm. and heated to 122 degrees F. to remove water. After no more water could be driven off, the reaction mixture was cooled. The residue solidified to a waxy solid.

(b) A 250 ml. flask was fitted with a reflux condenser. To 30 g. of the waxy solid product produced above in part (a) of this example, there were added 100 ml. of a 20% aqueous sodium hydroxide solution. The flask was heated by means of a heating mantle and was refluxed for a period of 10 hours. After this time, two layers appeared in the flask. To the flask was added 100 ml. of ether. The contents were transferred to a separatory funnel and the layers separated. The ether layer was washed with water, dried, and the ether evaporated leaving an orange residue. The yield of crude aziridine was 66%. I.R. analysis: 3.28 microns ($CH_2$ of strained ring), 7.90 microns (also present in N-ethylaziridine).

EXAMPLE 9

To 125 g. of the REA product produced in Example 1, there were added 89 g. of glucono-δ-lactone. The reaction was carried out in a 500 ml. beaker. The temperature of the mixture was brought to 212 degrees F. and maintained there for a period of 3 hours. The reaction mixture became quite viscous and darkened slightly in color. The yield of the resulting gluconamide of said long chain amine was essentially quantitative. I.R. analysis: 6.20 microns (amide).

EXAMPLE 10

A 230 g. sample of REA product produced in Example 1 was added to 148 g. of phthalic anhydride in a 1-liter beaker. An exothermic reaction took place with the temperature rising to 158 degrees F. The reaction mixture cooled to a brown viscous mass. I.R. analysis: 4.2 microns ($NH_2+$-), 5.80 microns (ester), 6.20 microns (amide), 6.30 microns (carboxylate). The reaction proceeded to completion with the formation of a mixture of the ester and amide of said long chain amine with phthalic anhydride.

EXAMPLE 11

To 98 g. of maleic anhydride in a 1 liter beaker were added 225 g. of the REA product produced in Example 1. After the exotherm had subsided, the reaction mixture was cooled. It was a brown viscous mass. I.R. analysis: 4.2 microns ($NH_2+$), 5.85 microns (ester), 6.2 microns (amide) and 6.30 microns (carboxylate). A reaction product similar to that obtained from phthalic anhydride was formed.

The long chain amine products of the present invention find use in a variety of industries and for a variety of purposes. In the first place, they can be used for the same purposes for which long chain amines generally heretofore known to the art are utilized as, for instance, as corrosion inhibitors, as flotation agents, as antistatic agents and as surfactants in the form of salts of the amines such as the hydrochlorides and acetates, and as intermediates for the production of various products which find use in detergents, textile softeners, and for a host of other uses. Salts of the long chain amines of the present invention are prepared simply by mixing equimolecular quantities of said amines with acids. Salts of long chain acids, such as oleic acid, are oil-soluble, while short-chain acids, e.g. acetic acid, give water-soluble materials. They are generally viscous liquids or semi-solids. Sulfate and phosphate esters of the REA products exhibit good washing, cleansing, dispersing and wetting properties, and are capable of dissolving or solubilizing or dispersing water insoluble compounds.

An outstanding feature of the REA products resides in the random distribution of the functional groups along the interior of the paraffin chain. This characteristic has been found to be valuable for corrosion inhibition in acid pickling operations. The following table shows the results in corrosion inhibiting tests using said amines in comparison with such amines as lauryl amine, "Primene 81–R" and "Duomeen CD" which have heretofore been recommended for such usage. It will be seen that the REA products show clearly superior corrosion inhibiting properties. The amines listed were dissolved in 15% hydrochloric acid, and the corrosion rate of a mild steel corrosion coupon was measured. The tests were conducted at 200° F.

TABLE.—CORROSION INHIBITION IN ACID PICKLING

| Inhibitor | Equivalent weight | Conc. percent | Corrosion rate, lb./ft.²/day |
| --- | --- | --- | --- |
| Blank | | | 4.11 |
| Lauryl amine | 183 | 0.7 | 1.29 |
| "Primene 81–R" | | 0.4 | 0.545 |
| "Duomeen CD" | 242 | 0.5 | 0.690 |
| REA 54–72 | 322 | 0.7 | 0.278 |
| REA 23–130 | 224 | 0.4 | 0.263 |

REA 54–72 contains unreacted paraffin hydrocarbons. REA 23–130 is a distilled product which is, therefore, largely free of unreacted paraffin hydrocarbons. The presence of unreacted paraffin hydrocarbons does not appear to interfere with the performance of the REA product for this purpose.

The long chain amines of the present invention are also useful in dispersing metal oxides in acids. This may be shown, for instance, by adding 10 drops of REA to a beaker containing 1 g. of C.P. $Fe_2O_3$ or $Pb_3O_4+25$ ml. of 15% aqueous hydrochloric acid. The mixture forms a stable dispersion in contrast to a blank in which no REA was used and wherein the $Fe_2O_3$ or $Pb_3O_4$ settles out rapidly. Still another utility of the REA products is for the product of monoamides therefrom with polyfunctional acids such as tartaric acid, citric acid, and malic acid, said monoamides being useful as rust and corrosion inhibitors in normally liquid oleaginous compositions, particularly in the presence of water. Quaternary ammonium compounds derived from the long chain amines of the present invention are useful as bactericides or bacteriostats.

What is claimed is:

1. A method which comprises providing a starting product prepared by partially chlorinating a petroleum derived hydrocarbon fraction consisting essentially of $C_8$ to $C_{18}$ straight chain paraffins to the extent whereby from about 10 to 25 mol percent of the paraffins are chlorinated, and chlorinated hydrocarbons being essentially secondary monochlorinated hydrocarbons, said starting product being largely free of branched chain hydrocarbons and of chlorinated branched chain hydrocarbons, then admixing therewith at least one member of the group of monoethanolamine, N-methylethanolamine, monoisopropanolamine and ethylenediamine, and reacting said mixture in absence of added solvent at a temperature in the range of about 150 to about 425° F. at a pressure selected from atmospheric pressure and pressures in excess of atmospheric pressure to produce the corresponding alkylated amines, the resulting alkylated amines being substantially free from olefins.

2. A method which comprises providing a starting product prepared by partially chlorinating a petroleum derived hydrocarbon fraction consisting essentially of $C_8$ to $C_{18}$ straight chain paraffins to the extent whereby from about 10 to 25 mol percent of the paraffins are chlorinated, said chlorinated hydrocarbons being essentially secondary monochlorinated hydrocarbons, said starting product being largely free of branched chain hydrocarbons and of chlorinated branched chain hydrocarbons, then admixing therewith ethylenediamine, and reacting said mixture in absence of added solvent at a temperature in the range of about 185° F. to about 375° F. and at a pressure in excess of atmospheric pressure and in the range up to 100 lbs./sq. in., to produce the corresponding alkyalted ethylenediamine, the resulting alkylated ethylenediamine being substantially free from olefins.

3. The method of claim 2 in which the reacted mixture is allowed to remain essentially undisturbed after completion of the reaction and is cooled, whereby to form layers, separating the upper layer, acidifying the same under conditions of agitation, allowing the mixture to stand to effect separation of phases, removing the lower layer, adding sodium hydroxide thereto, allowing the mixture to stand, and separating the upper layer containing the desired alkylated ethylenediamine.

4. The method of claim 1 in which the reacted mixture is allowed to remain essentially undisturbed after completion of the reaction and is cooled, whereby to form layers, separating the upper layer, acidifying the same under conditions of agitation, allowing the mixture to stand to effect separation of phases, removing the lower layer, adding sodium hydroxide thereto, allowing the mixture to stand, and separating the upper layer containing the desired alkylated amines.

References Cited

UNITED STATES PATENTS

| | | | |
| --- | --- | --- | --- |
| 3,436,420 | 4/1969 | Dudzinski | 260—583 R |
| 3,287,411 | 11/1966 | Wakeman et al. | 260—583 R |
| 3,385,893 | 5/1968 | Wakeman et al. | 260—583 R |
| 3,294,851 | 12/1966 | Roobo et al. | 260—583 R X |
| 3,371,118 | 2/1968 | Lundeen et al. | 260—583 R |

JOSEPH REBOLD, Primary Examiner

R. L. RAYMOND, Assistant Examiner

U.S. Cl. X.R.

252—152, 390, 392; 260—239 E, 561 B, 567.6 M, 583 R, 584 R, 585 A, DIGEST 19